United States Patent [19]

Kozak

[11] Patent Number: 4,511,790
[45] Date of Patent: Apr. 16, 1985

[54] MULTIPLE LOAD CONTROL APPARATUS HAVING LOAD EQUALIZATION

[75] Inventor: Norman M. Kozak, Greendale, Wis.

[73] Assignee: A. O. Smith Corporation, Milwaukee, Wis.

[21] Appl. No.: 430,258

[22] Filed: Sep. 30, 1982

[51] Int. Cl.³ .............................................. H05B 1/02
[52] U.S. Cl. .................................... 219/486; 219/483; 219/497; 219/328; 219/331; 307/39; 307/41
[58] Field of Search ............... 219/494, 501, 328, 330, 219/331, 497, 483, 486, 321; 307/39–41

[56] References Cited

U.S. PATENT DOCUMENTS

| | | | |
|---|---|---|---|
| 4,181,950 | 1/1980 | Carter | 307/39 |
| 4,276,603 | 6/1981 | Beck et al. | 219/486 |
| 4,321,477 | 3/1982 | Bartlett | 307/39 |
| 4,333,002 | 6/1982 | Kozak | 219/486 |

*Primary Examiner*—M. H. Paschall
*Attorney, Agent, or Firm*—Andrus, Sceales, Starke & Sawall

[57] ABSTRACT

A controller for a water heater having a plurality of individual electrical heating elements changes the number of energized elements to maintain a predetermined minimum temperature. The number of "on" elements is related to the difference between sensed water temperature and a preset water temperature divided by a dead band factor. The heating elements are turned "on" and "off" in a programmed sequence whenever a change is required to optimize the equalization of operating time of the elements. The controller includes a microprocessor which monitors turn "on" or "off" of each element to continuously develop the "on" operational period of each element in relationship to all of the other heating elements since system initialization. The operation period is made relative to the load with the shortest period by substracting the lowest "on" time from all other loads so as to reduce the required memory size. The microprocessor periodically updates the status by processing of the last read and stored signals to create appropriate control signals for turning elements on and off in accordance with the longest and shortest operation periods respectively and thereby equalize element loading.

16 Claims, 5 Drawing Figures

Microfiche Appendix Included
(1 Microfiche, 034 Pages)

CHART 1 - MAIN PROGRAM

MULTIPLE LOAD CONTROL APPARATUS HAVING LOAD EQUALIZATION

BACKGROUND OF THE PRESENT INVENTION

Reference is hereby made to the Microfiche Appendix "A" forming a portion of this specification and containing 1 microfiche and a total of 34 frames.

This invention is directed to a multiple load control apparatus for a multiple inputted load apparatus and particularly to a step-type controller for a water heater or like load means having a plurality of selectively actuated heating elements.

Multiple input apparatus may include a plurality of individual actuated load inputs for controlling the state of or conditioning the load apparatus by sequential and selective actuation of such plurality of inputs. For example, water heating apparatus may be constructed with a plurality of individual heating elements or units rather than one single modulated element for varying the thermal energy inputted into the stored water. The heat input may be conveniently controlled by varying of the number of the heating elements which are activated at any given time. The actuation of the heating elements may be varied depending upon the temperature of the stored water, the time of day, the anticipated usage, the recovery rate requirements and any other factor or condition which can effect the heat input requirement. In such a system, it may be desirable to provide for particular types of sequential operations of the load devices. This in turn requires proper sensing and monitoring of status of all such load input devices as well as the various control factors, and then controlling the load or element activations in accordance with the predetermined relative sensed and monitored conditions.

Various means have also been suggested for controlling the turn-on and off of the several heating elements. For example, U.S. Pat. No. 3,787,729 discloses a water heater control system in which the heating elements are turned on and off with a first-on, first-off energizing sequence, and canously, a last-on, last-off de-energizing sequence. This tends to prevent continued usage of a single heating element. The system suggested therein, thus provides a register-type record of the sequence of turn-on and turn-off so an appropriate element can be selected.

A particularly satisfactory step-type controller for such a system having a plurality of individual load means which are individually and separately activated with a first-on, first-off, and a last-on, last-off sequence and further based on operating factors is shown in the inventor's U.S. Pat. No. 4,333,002 which permits appropriate modification as well as recording of the first-on and last-on heating elements. As shown therein, as applied to a water heater unit having a plurality of individual electrical heating elements, the total number of heating elements on at any time is related to the difference between the actual water temperature and a preset desired water temperature with a differential span or dead band to prevent hunting in the control system. A microprocessor unit is coupled correspondingly and periodically sense the conditions of the sensors and signal sources as well as monitoring and storing the on-off status of each of the heating elements. The historical sequence of when each heating element was last turned on or off in relationship to all of the other heating elements is particularly monitored. The microprocessor periodically updates the status by processing of the last read and stored signals to develop the difference between the actual and desired water temperatures, dividing the same by the span setting signal to provide for a predetermined acceptable variation and adding a constant to produce a number corresponding to the number of elements which should be in an activated state for that condition. Such number is compared with the actual number of elements then on, and if there are any deviations, appropriate control signals are generated to increase or decrease the number of activated elements to the predetermied and preset number for that temperature condition.

The logic unit can readily store the historical sequence and when required, turn off the load from all loads then on which was the first to be turned on and to turn on the load from all loads then off which was first to be turned off. This then provides a sequence wherein the first-on is the first-off, and the last-on is last-off in the turn-on and turn-off sequences of operation. Other multiple load control systems are shown in the citation in the above patents.

In this manner a more or less generalized equalization of the loading of the elements is created. Although providing improved control over various other forms of logical systems, the individual elements may be operated with abnormal and undesirable extended periods.

There is therefore a need for an improved system for equalizing the load operations and thereby providing increased efficiency and overall system life operation.

SUMMARY OF THE PRESENT INVENTION

The present invention is directed to a sequential step controller including means to establish and maintain substantial equalization of the operating time of a plurality of load devices by establishing a continuous operating life monitor to record the effective total periods of operation of each load device in combination with means to turn the loads on, and off, respectively in accordance with those loads having the shortest, and longest, periods of actual operation. Generally, in accordance with the present invention, a timing means is provided for monitoring the accummulated operating time of each of the several loads, and at each signal or demand for load turn-on or load turn-off, selecting that load for turn-on or turn-off based on comparison of the effective total operational load life to provide optimum systems operation. The present invention is thus based on the continuously monitoring and updating of the operating life of each of the loads, recording such time period, comparing of the time periods of the relative past operational life of the several loads and providing turn-on of the shortest past operational life load and turn-off of the longest past operational life load and is thereby particularly adapted to microprocessor implementation. Thus, a microprocessor may be provided with appropriate time memory slots in a RAM memory assigned to each load element.

The present invention is particularly adapted of course to water heating systems and the like which involves a continuous and long life operating systems. To provide an effective continuous record of the load conditions provides a very substantial demand on the timing means. In accordance with a preferred and unique embodiment of the present invention, the load recording means is updated at each switching period, or at some other suitable periodic system, whereby the total operating life of each load is established relative to the load with the shortest operating time, and in particular operating life time is reset by reducing each time record by the level of the shortest operating life load. In this manner, the loads are selectively turned on and off such that the operating life of each load is caused to move in a direction to equalize the operation of the other loads and thereby establish close substantial equalization of load operating times.

In a water heating system, a plurality of heating elements similar to those disclosed in the recently issued U.S. patent is provided. A sequence operator for the loads is provided, and are both operated and monitored by a microprocessor unit. The turn-on and turn-off of the individual heating elements is then controlled to turn off the then operating load having the longest period of operations to that time and to turn on the load which has the shortest period of operation to that time.

The heating elements in an optimum system are activated in a predetermined sequence based on a total "on", or "off" history such that the system functions turning on the heating element which has the minimum energized time since system initialization and turning off the heating element which has the maximum energized time since system initialization. Generally, in accordance with a preferred embodiment of the present invention, sensing means monitor the temperature of the water and generates a proportional signal which is compared to a presettable input signal means which preferably includes an interrelated temperature span or dead band signal control. Various other control signal sources may also be provided and processed for interrelated control of the operation of the loads. The controller includes a logic unit, which preferably includes a microprocessor unit, to correspondingly and periodically sense the conditions of the sensors and signal sources as well as monitoring and storing the present on-off status of each of the heating elements and further including the past operating periods of each of the heating elements. The past operating periods are particularly recorded by storing the related energized time of each heating element relative to that of the heating element with the shortest energized time. The microprocessor periodically updates the status by processing of the last read and stored signals to develop the difference between the actual and desired water temperatures, dividing the same by the span setting signal to provide for a predetermined acceptable variation and adding a constant to produce a number corresponding to the number of elements which should be in an activated state for that condition. Such number is compared with the actual number of elements then on, and if there is any deviation, appropriate control signals are generated to increase or decrease the number of activated elements to the predetermined and preset number for that temperature condition. The logic unit can readily store the historical total operating life of the several load means and when required turn off the load means which has had the longest operating period or turn on the load means which has had the shortest operation period. The step controller then permits the selective control of the various load inputs in a predetermined manner to maintain most effective system operation.

The present invention permits individual programming and controlling a water heater or other similar device having multiple load means in accordance with individual customer demand with each turn "on" or "off" of a load means tending to equalize the load means operation and thereby establish optimum operation of the load means.

DESCRIPTION OF THE DRAWING FIGURES

The drawing furnished herewith illustrates a preferred construction of the present invention in which the above advantages and features are clearly disclosed as well as others which will be readily understood from the following description.

FIG. 1 is a diagrammatic illustration of a water heater unit incorporating a controller constructed with the teaching of the present invention; and FIGS. 2–5 are a series of interrelated flow diagrams identified as program charts, illustrating a logic sequence for the system of FIG. 1.

DESCRIPTION OF THE ILLUSTRATED EMBODIMENT

Figure 1:
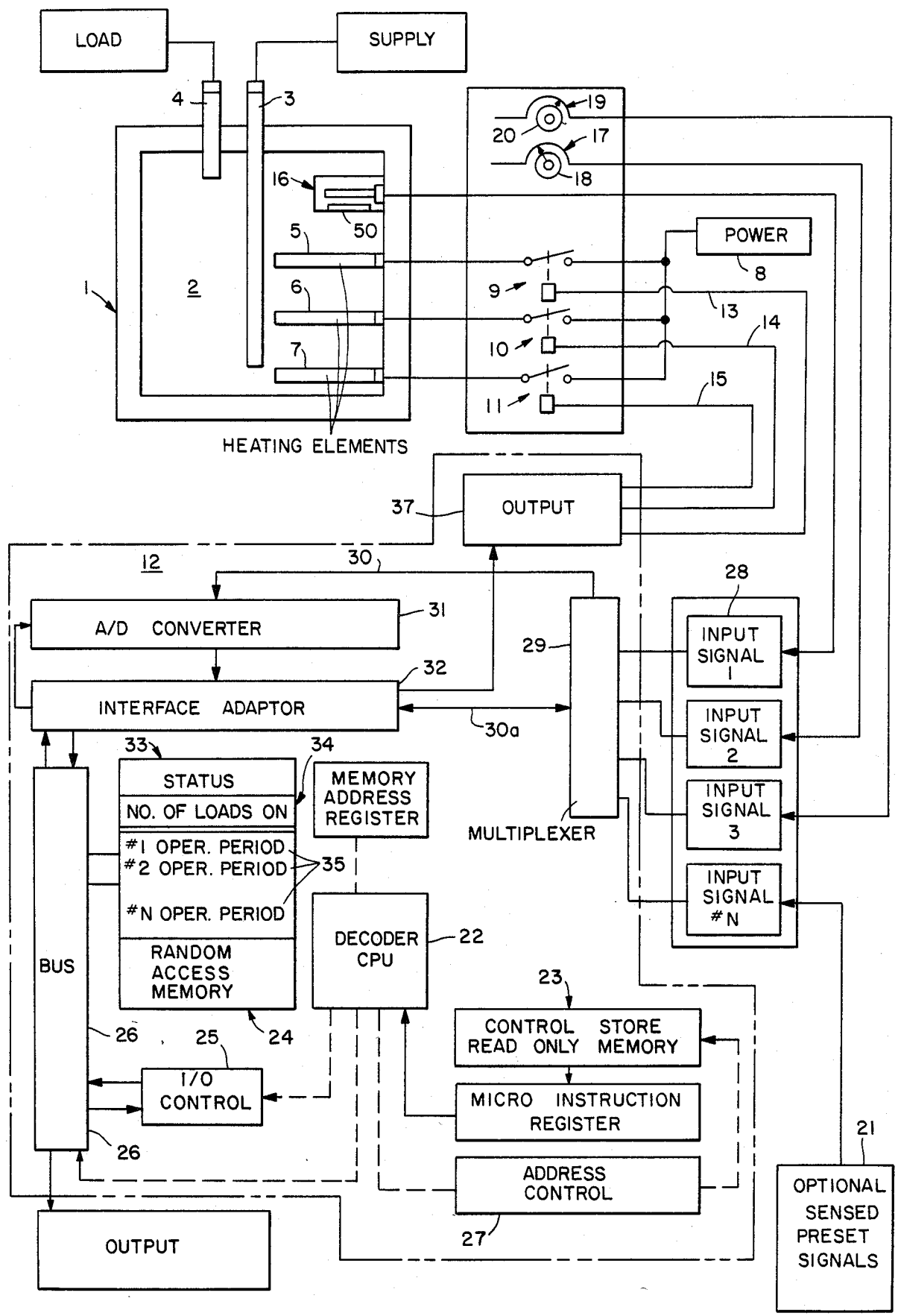
Figure 2:
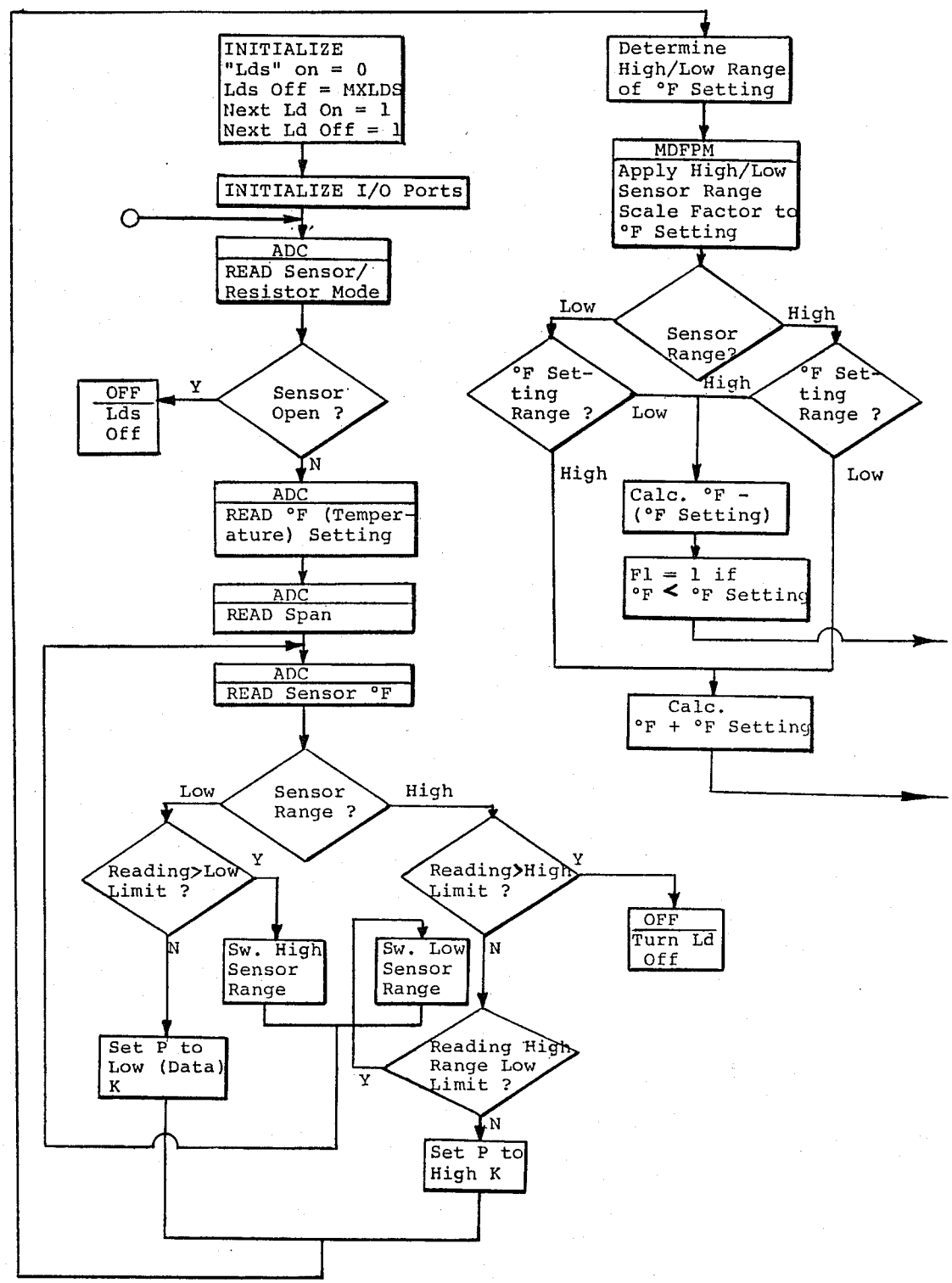
Figure 3:
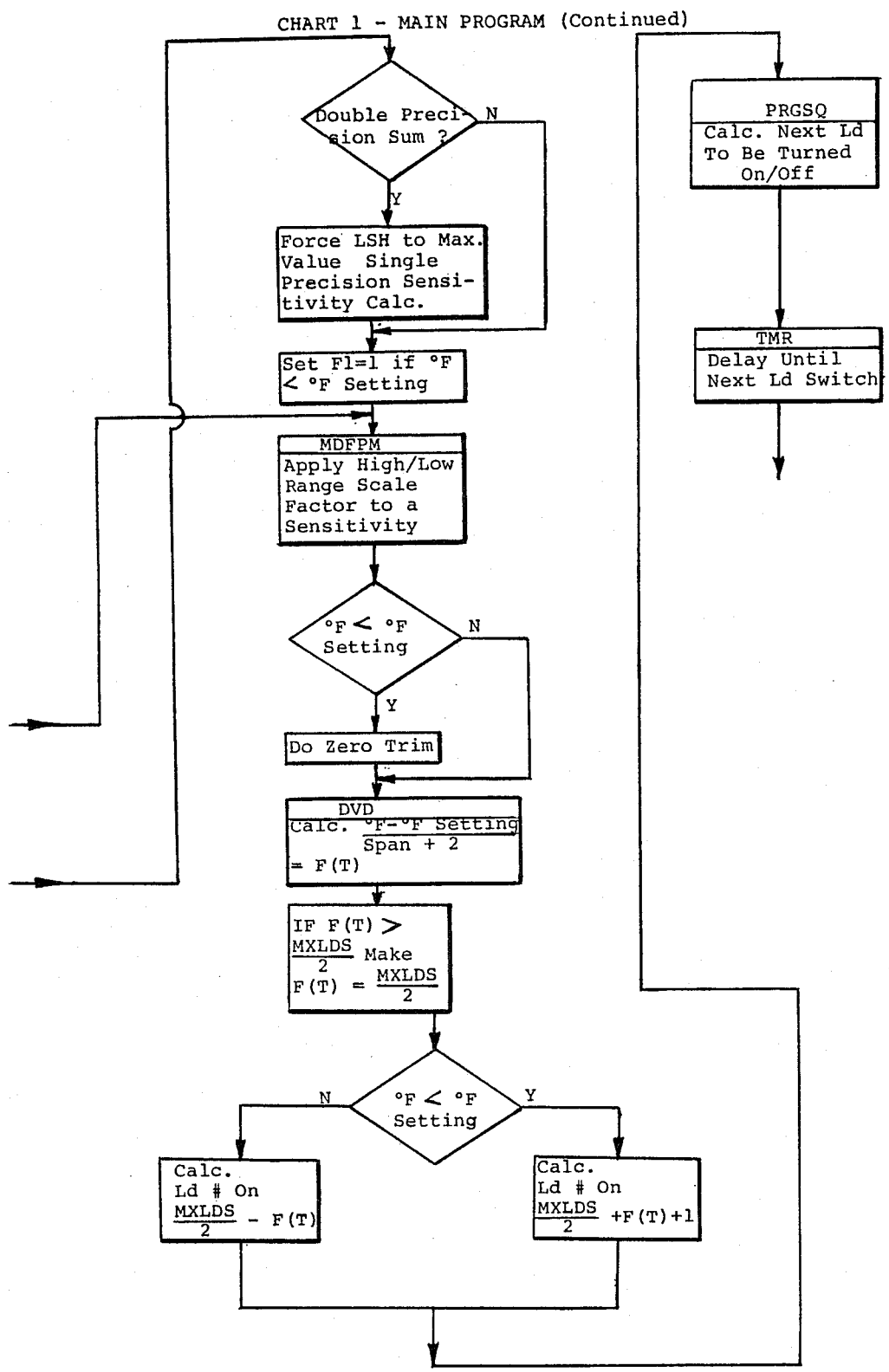
Figure 4:
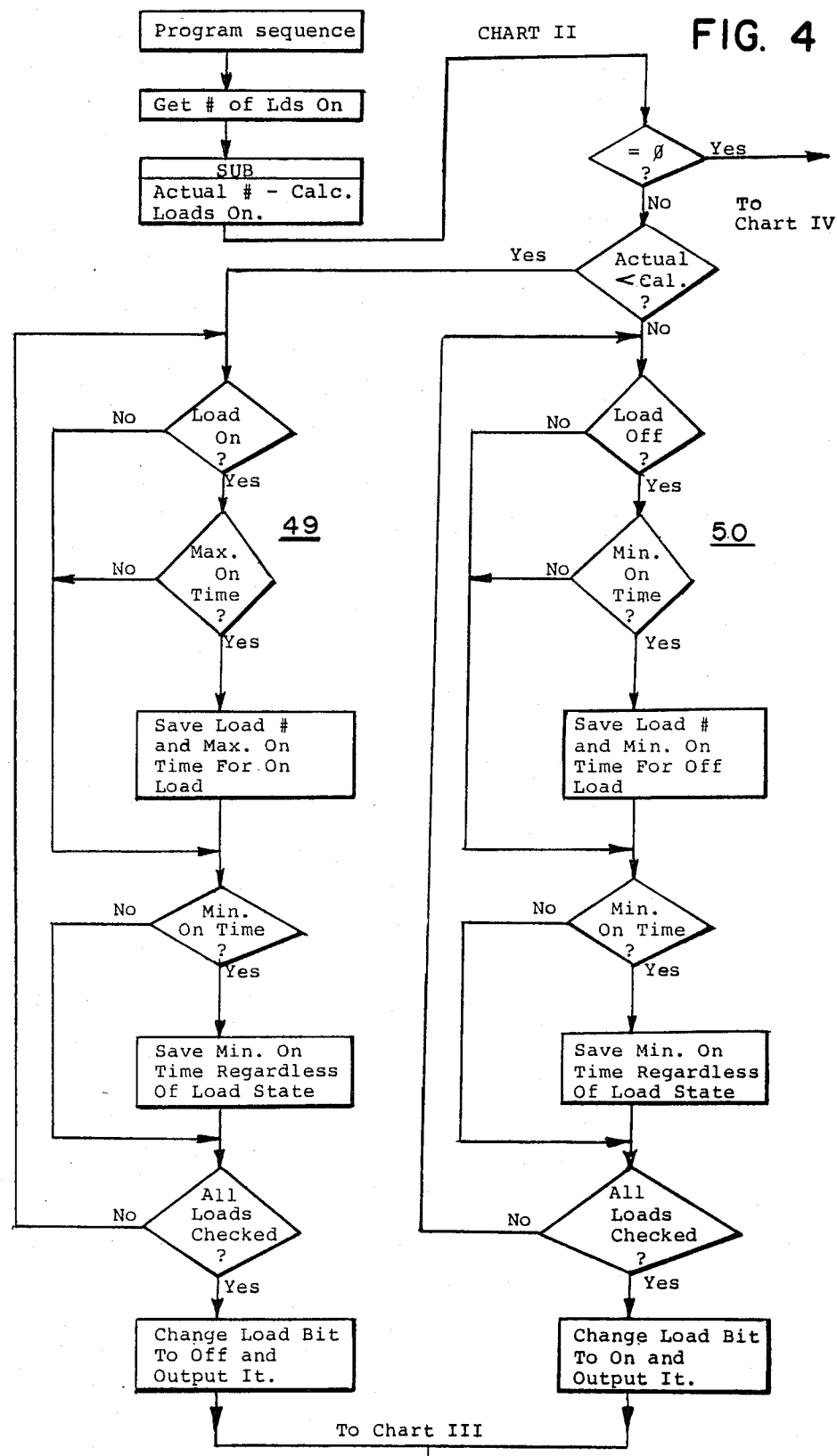
Figure 5:
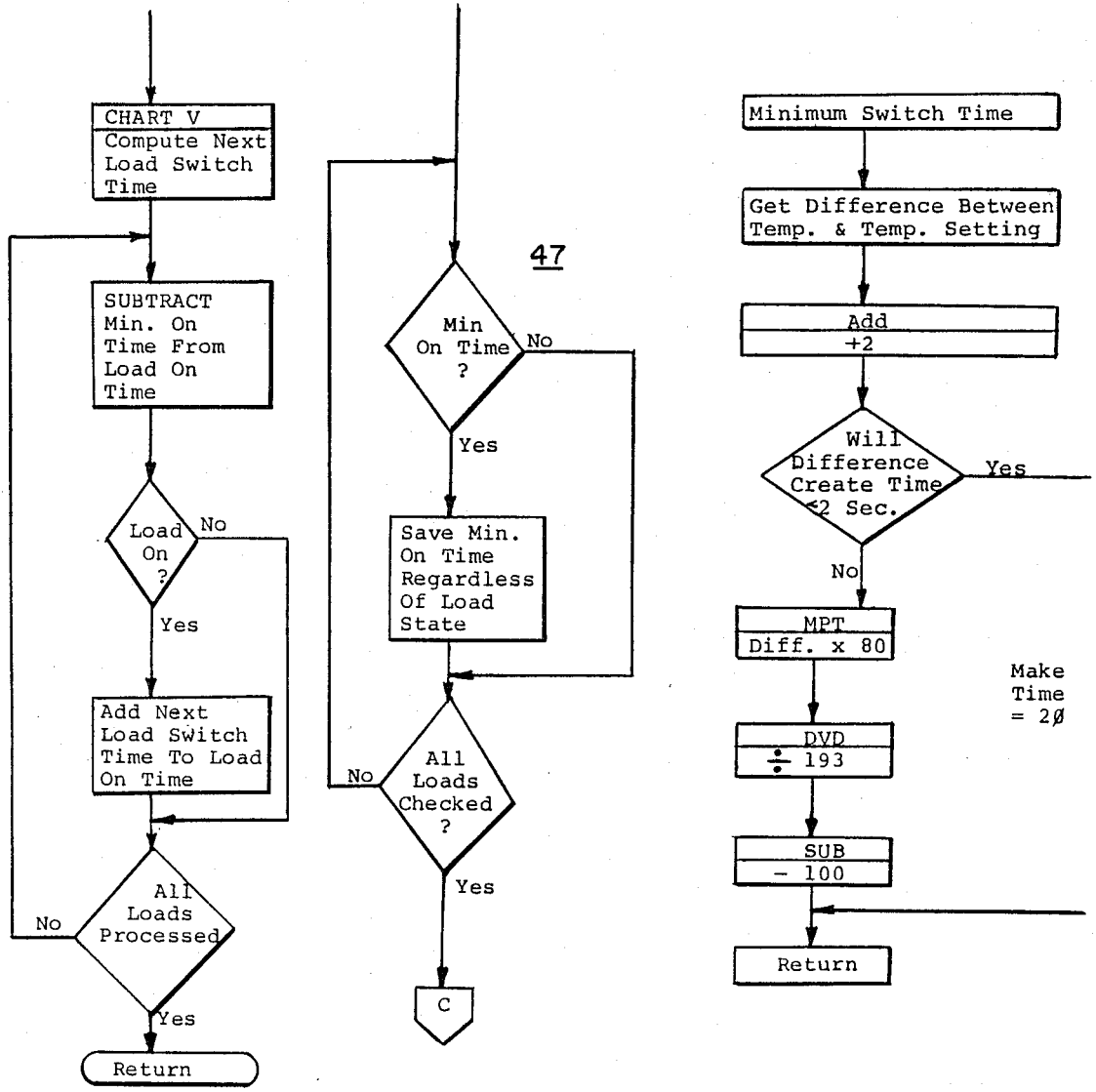

Referring to the drawing, a water storage unit is shown including an insulated tank 1 filled with water 2. A supply inlet 3 is connected to the storage tank 1 from any suitable source, not shown, and an outlet 4 is shown for distributing of the water to the home or other consuming device. Three separate electrical immersion heating units 5, 6 and 7 are shown secured to the wall of the storage tank 1 extending into the water and connected to a suitable electrical source of power, shown generally at 8, generally as shown in the inventors' issued U.S. patent. The heating units 5, 6 and 7 are individually and separately connected to such power supply 8, and in the illustrated embodiment of the invention, are connected thereto by suitable separate activators, shown as electromagnetically actuated connectors or switches 9, 10 and 11. The switches 9–11 are adapted to be selectively activated by a controller 12 which is specially constructed and is shown having three individual outputs 13, 14 and 15 coupled respectively to the switches 9–11. The controller 12 is a microprocesser base controller which is adapted to selectively activate the individual outputs 13–15 in a logical sequence based on the demand of the hot water heater as well as historical operating life of the heating elements 5, 6 and 7. Generally, the controller 12 includes means to record the past total operating life of each element 5–7. As the demand increases, the controller 12 operates to turn-on the heating element which has the shortest operating life since system initialization. As the demand decreases, the controller turns-off the element having the longest operating period since system initalization.

More particularly, and as in U.S. Pat. No. 4,333,002, a temperature sensor, such as a well known thermistor probe, is coupled to the storage tank 1 to sense the temperature of such water. Sensor 16 develops an electrical condition signal proportional to the temperature of the water 2. The sensor 16 is connected as one input to the controller 12. In addition, a set point signal generator or unit 17 is provided for generating a related set point signal corresponding to the desired temperature. A suitable manual dial 18 is provided for adjusting the setting of set point unit 17. The set point unit may be the well known potentiometer having an adjustable contact coupled to the dial 18. A span adjustment unit 19 provides a similar signal source for producing a differential temperature setting span or dead band signal. The span adjustment unit 19 includes its own separate control 20 for adjustment of a related electrical signal connected to the controller 12. The span signal requires a selected minimum difference in the preset temperature and the actual temperature before a change in the number of heating elements activated or deactivated is made. In addition, other monitored states may be inputted through one or more auxiliary controller inputs 21. Such optional inputs might, for example, include time of day, anticipate temperature changes, water usage or any other conditions which would be a factor in determining the particular number of heating elements 5-7 to be activated. More particularly, as applied to a water heating apparatus for providing hot water to a heating system the water may advantageously be heated at a rate inversely proportional to the outdoor temperature. For example, if the outdoor temperature were to increase by 10, the water temperature may be decreased by some proportional level. If a one-to-ten ratio had been selected, the water temperature would be decreased by 1°. Any other relationship might of course be provided. Further, the electrical power companies, particularly for relatively large installations, may include a demand load charge at different periods and/or based on a usage level above some selected normal maximum. It may be desirable to limit the permitted maximum demand or load in accordance with certain characteristics, such as the outdoor temperature. Thus, if the outdoor temperature is below a given level, it may be necessary to provide maximum input to the water heater including simultaneous operation of all available heating elements to establish an adequate supply of hot water to the heating system. However if the outdoor temperatures should rise by some factor, such as by 10 to 20, the necessity of providing maximum hot water may be significantly less even though the sensing system might temporarily demand such an input. Suitably monitoring of the outdoor temperature can be provided to limit the number of loads which can be turned on and thereby minimize the periods when maximum demand charges are applicable. In such a system, means might be used to continuously monitor the power consumed in relationship to the demand charges and provide a continuous modulation and related control of any desired characteristic. These and other similar inputs depending upon predetermined calculated conditions, sensed conditions or the like, can all be readily incorporated into the logic control of the sequence controller for any load device and the above examples as applied to a water heater are given for purposes of more clearly explaining the possible scope of the teaching of the present invention.

In the illustrated embodiment of the invention, the controller 12 includes a microprocessor 22 coupled to the individual signal sources including sensor 16 and preset temperature and span potentiometers 17 and 19. The microprocessor 22 is operable to continuously monitor, and record the corresponding input signals in appropriate form for logical processing. The microprocessor 22 may of course be conveniently located with respect to the storage tank 1 with appropriate access to an operator for adjustment of the various manually operable inputs.

The microprocessor in particular is programmed to sequentially read the condition sensor and other input units, relate such signals to each other at any given time to develop an energy consumption or demand signal which is used to energize selected ones of elements 5, 6 and 7 in a predetermined sequence.

The microprocessor 22 thus operates to periodically sample each of the sensor 16 and the input units 17 and 19 in a continuous cyclical manner, thereby continuously updating the record of the existing water temperature and the desired temperature. This information is directly stored within the microprocessor after appropriate processing, which may include appropriate weighting for various factors.

The difference between the actual and the desired temperature determines the number of elements 5, 6 and 7 which are to be energized. The microprocessor 12 further functions to energize the appropriate number of elements and to actuate them in sequence to turn on the heating element which has the minimum energized time since system initialization and turn off the heating element which has the maximum energized time since system initialization.

The microprocessor 22 is typically shown, as will be readily understood by those skilled in the art, in a functional block diagram in which the data storing and processing are controlled by an internal control unit with the sequential sampling, processing and storing of the temperature and related data. The system includes a ROM memory unit or section 23 within which a fixed program is provided for controlling of the logical and sequential inputting data, processing such data, storing such processed data and outputting of appropriate signals to activate the outputs lines 13-15 and thereby control energizing heating elements 5, 6 and 7. A RAM memory section 24 is provided for appropriate storing of data. Data is introduced and outputted through a suitable I/0 unit 25 which is connected to the external system by the common bus structure 26. The routing is controlled by appropriate addressing and decoder unit 27, all under the control of the basic program stored in control unit 23. The microprocessor 22 of course includes the necessary arithematic and logic processing units which operate on the collected data and stored data in accordance with specific instructions contained within the memory control unit 18.

For example, a microprocessor manufactured and/or sold by Intel Corporation and identified as an Intel 8035 may be used. The operation and specific connection will be made depending upon the particular microprocessor 22 and will be readily understood by those skilled in the art particularly when taken with the flow chart attached hereto, and the program listing in the attached appendix "A" which provides one sequence for the outputting data based on the input devices as well as the necessary processing and storage of signals based on the combination of input signals and the historical signals.

More particularly, the sensor 16 and input devices 17 and 19 for the water heater are similarly connected by individual signal conditioning devices 28 to the input side of a multiplexer 27 having a common output line 30. The multiplexer 29 sequentially and cylically operates to couple one of the conditioning device 28 at a time to the output line 30 to transmit the corresponding temperature or other related signal under a processor control signal connection shown schematically by line 30a. The multiplexed inputs are analog signals. An analog-to-digital convertor 31 is connected to the output of themultiplexer 29 and is operable to convert each of the analog signals into an appropriate digital signal for processing by the digital microprocessor 22. A peripheral interface adaptor 32 of any suitable construction is provided for coupling of the digital signals to the microprocessor 22, via bus 26. The interface adaptor 32 functions in a well known manner as a gating device coupled to the common bus for establishing two-way communication between the temperature input section and the microprocessor 9 which permits transmitting of the processed signals, transmitting appropriate timing signals to the multiplexer and the like. The rate of sampling is controlled by a suitable timing means which may be directly derived or controlled by the microprocessor 9 in any suitable well known manner.

The adaptor 32 thus responds to signals from the processor 22 to transmit the signals to the multiplexer 29 and to the A/D converter 31 and thereby provide for reading the several inputs, converting such readings and transmitting the same to the microprocessor RAM memory 24. In addition, the microprocessor RAM memory has an appropriate status storage section 33 in which the operating status of each of the heating elements 5, 6 and 7 is stored. The processor thus stores in a first location 34 in memory, the number of loads or elements 5, 6 and 7 which are energized.

Further, in accordance with the teaching of this invention, the microprocessor 22 records the total operation period or time of each of the heating elements 5, 6 and 7. The RAM memory has locations 35 allocated to each load in which the energized time is stored. In each location, the total operational life of a heating element 5-7 is stored, with periodic update. The controller 22 preferably records the energized time of each heating element 5, 6 or 7 relative to the other heating element with the shortest energized time. This produces a running record of the effective accummulated "on" time of each heating element from the initialization of the controller. The total operating time of the system or an element is referred to herein as the period of operation. As more fully developed, because a continuous record of the period of total operation may not be practical, the system is preferably constructed such that the "on" time with reference to the element with the least "on" time is recorded.

In the illustrated embodiment, the microprocessor 32 is programmed to periodically update the time history of the loads with respect to the element with the shortest period. Thus, the minimum time is subtracted from the energized time of all the loads. This operation in essence results in recording the energized time of each load relative to the load with the shortest energized time. The microprocessor 32 then adds the next load switching time interval to all energized loads. This updates the energized time monitoring memory 35.

The output from the microprocessor 22 is coupled by an output signal conditioner 37 which includes a suitable signal converter such as an RS232C converter to transmit suitable analog signals to the appropriate electromagnetic unit 9-11.

In operation, the microprocessor based controller 12 may continuously monitors the input data on a periodic basis, such as in U.S. Pat. No. 4,333,002. The several analog input signals from the sensor 16 and from the presettable input signal sources 17 and 19 are time multiplexed to the A/D converter 31 and the appropriate digital representation stored in the computer data RAM memory 24. The program is periodically activated and for example, as shown in flow charts attached hereto, operates on the last stored signals to determine the number of elements 5, 6 and 7 which should then be operating based on the stored data. This program is shown as the same program in U.S. Pat. No. 4,333,002 to the inventor, such as shown in Chart I. In particular, the microprocessor 22 determines the difference between the water temperature and the temperature setting as recorded in the data memory, and divides such difference by the span setting to determine whether or not the differential exceeds the acceptable difference. A constant is added to produce a condition number indicative of the number of elements to be then operating. The final condition number is then compared with the existing number of elements 5, 6 and 7 then in the "on" state, as stored in the microprocessor memory 34.

If the numbers agree, no load change is required and the microprocessor 32 proceeds with other programmed processing. In the illustrated embodiment, the microprocessor 32 is programmed to update the time history of the loads, as shown in the attached Chart IV. Thus, the minimum energized time of any load regardless of load state is determined. This minimum time is then subtracted from the energized time of all the loads. This operation in essence results in recording the energized time or period of operation of each load since system initialization relative to the load with the shortest energized time. The microprocessor 32 then adds the next load switching time interval to all energized loads. This updates the energized time monitoring memory. Thus, the RAM memory has locations allocated to each load in which the energized time is stored.

If the number differs and indicates more elements should be operating, the microprocessor 22 continues to process the data to determine which de-energized element has the minimum accummulated energized time, as shown in Chart II. It then generates an output as shown in Chart III to the proper load line 13, 14, or 15 to turn on the corresponding then "off" heating element 5, 6 or 7 having the shortest period of operation. Concurrent with checking for the minimum energized time of a de-energized element, the microprocessor also determines the minimum accummulated energized time for any load regardless of load state. This time is used to update the relative energized time of the loads; that is, this time is subtracted from all other times to establish a new time reference from which the past operational history is properly given.

If the number differs and indicates less elements should be operating, the microprocessor 22 continues as shown in Chart II in a similar sequence to that just described and particularly to process the data to determine which energized element has the maximum energized time. This generates an output to that load line 13, 14 or 15 to turn off the then "on" heating element 5, 6 or 7, having the longest period of operation. Concurrent with checking for the maximum energized time of an energized element, the microprocessor also determines the minimum energized time for any load regardless of load state, and updates the relative energized time records of the loads.

The time update performed by the microprocessor is for either case in exactly the same manner as described if no loads are required to change state.

After turning "on" or "off" of an element or elements, the microprocessor 22 returns to other normal tasks until the next sampling and updating of the status of energization of the elements. The processor of course updates the status storage sections 34-36 of memory unit 24 for proper processing and subsequent control of the energization elements 5-7.

As noted previously, any other plurality of input options can be multiplexed into the unit to provide for a desired operating sequence and control. The system may also provide for additional logical factors for controlling the operating sequence and activation of the individual elements without a significant change in the system controller. The several elements may, for example, have certain different characteristics which may be used to change the sequence. Such information can of course be readily stored within the microprocessor unit by inputting of the corresponding load characteristic into the system design.

The attached flow charts detail one sequence of the logic system and includes all significant steps to the various usual subroutines, such as those providing for mathematical calculations such as multiplication and division as well as various timing which might be provided. The mathematics subroutines have not been included because they are of a general known sequence and can be readily provided by those skilled in the art. The program listing of Exhibit A is complete for a ten step controller having a two port microprocessor and for a ninety to one hundred and ninety degree Fahrenheit range. The listing will be readily followed and understood by those skilled in the art, particularly in view of the illustrated embodiment and above description, and is only briefly summarized herein.

Referring to the attached program flow chart, the main program is shown in Chart 1 and includes the usual initialization of the system for reading and conversion of the analog input signals to appropriate digital form. If the sensor connection is open circuited, the loads are automatically turned off, as noted at 38. If not, the program proceeds to read and store the temperature setting, the span dial setting, and the thermister temperatures.

The illustrated system is set for controlling the water within selected ranges and the program establishes the appropriate temperature range scale factors. Control units have been constructed with controlling ranges of 40 to 140 degrees F., 90 to 190 degrees F., and 140 to 240 degrees F.. In a practical design, each range uses a temperature probe and an associated temperature probe conditioning circuit designed for that temperature range as well as the appropriate data constants stored in the program memory. In addition, in order to obtain the desired resolution and linearity from the temperature probe conditioning circuit, each range is separated into a low and high range section. For example, the illustrated 40 to 140 degrees F. range, a low range section may include 40 to 90 degrees F. and a high range section 90 to 140 degrees F.. The program flow chart diagrams the range switching which is of course produced by the necessary hardware and software in the controller.

As shown in chart 1, the initial portion of the programmed operation is similar to that of the inventor's previously patent to the determination of the number of loads to be activated. Thus, depending which range is employed, the signal is processed through an appropriate channel 39 or 40 with the appropriate data. For example, if the reading exceeds the low range section for the particular range, the system switches to the opposite high range section and is fed back into the system to again read the thermister temperature, as at 41. The signal is thereby processed through the appropriate range channel by pointing to the appropriate data constants, and setting an appropriate signal to apply the proper scale factor to the temperature setting in a multiplied data from program memory unit, as at 42. The modified sensor signal is then processed and compared to the temperature setting and the scale factor applied to the sensitivity setting, as at 43. The load calculation is then made based upon the difference between the actual temperature and the temperature setting divided by the sensitivity plus a load control factor, which is shown in the flow chart as a factor of two. This provides an algorithm function identifying the number of loads which should be on, or off, for that condition. The calculated value is compared to the number of loads on and off to establish data signal for the number of loads to be turned on or off, as at 44. The signal is processed to calculate the number of loads on or off, depending upon whether the temperature of the sensor is greater or less than the temperature setting. If the actual temperature is greater than the temperature setting the number of loads on are calculated by the difference of the maximum number of loads factor minus the function value from the previous calculation. If the temperature is less than the temperature setting, a calculation for the number of loads on is made by adding of the maximum load factor, the previously calculated function valve plus one. In either step, the calculated value is applied to a program sequence subroutine 45 which is operable in a unique method to calculate the next load to be turned on or off, such as noted in a flow chart II. the output therefrom is applied to an appropriate timer subroutine 46 to delay the actual switching until the desired next load switching.

The sequence is then recycled as shown at 48.

The program sequence subroutine 45 to establish the load turn-on and turn-off in accordance with this invention is shown in Chart II, with the appropriate processor unit. If a processor with a greater number of ports is used, a table could be provided for selection of the appropriate port.

The subroutine 45 determines the number of loads "on" and compares that with the calculated number to be on. The program then enters into one of three routines depending upon whether (1) no change is necessary, (2) an element is to be turned on or (3) an element is to be turned off. If they are equal, the microprocesser jumps to a subroutine, such as that shown at 47 of Chart IV to update the period of operation of each load. Such data is stored in the memory, as at 35. If the comparison indicates a load must be turned "on," the program jumps to an "on" load selection program routine 49. This program proceeds through the sequence shown in Chart II, and also set forth in the microfiche listing in Appendix "A" and selects the then "off" load having the shortest period of operation. Similarly, a load "off" signal demand causes the program to jump to an "off" load selection routine 50. This program selects the then "on" load having longest period of operation. The program steps to the subroutine, shown in Chart III, for calculating a minimum switching time based on the magnitude of the difference in the temperature setting. The switching time signal is applied to a timer control subroutine. In this illustrated embodiment, a hardware timer is used and the time controlled through an interupt subroutine which can be readily provided by those skilled in the art. Generally, the time between switching of the loads on is related to the total temperature change to allow as rapid a control as permissible without adverse loading of the power system. A suitable minimum switch time sequence is shown in Chart V.

The system thus preferably updates the status of the loads at each switching time. Obviously, this time is not critical. The system, for example, can be actuated to periodically update the status of the loads and then provide direct actuation based on the last updated load signals. This would introduce possible error only as to the shortest period of time between the last updating and the current demand signal.

Obviously, in addition to such illustrated subroutines, other suitable or conventional subroutines are provided; for example, an off subroutine may be provided for turning off of all loads in the event of system malfunction; multiply divide and point subroutines are of course provided as well as an analog-to-digital conversion subroutine for use in the main and other subroutines.

This and similar detail can readily be provided and are not set forth to avoid undue polixity of the application. Appropriate listings are found in the program listing submitted herewith for reference and full required disclosure. However, any other suitable or desired program can of course be used to carry out the invention of recording the operational life of each load and activating the load means to equalize the operating life of the multiple load means.

Other controls can be incorporated into the controller or system operation of this invention in the same manner as in the based system of U.S. Pat. No. 4,333,002. For example, a low water level cut off circuit as shown in the above patent may be incorporated into the system to turn off all loads if the water level drops below a selected level; for example, below the level of the temperature sensor 16.

An internal control system which can be incorporated into the controller and also shown in the above patent is a timer security which ensures functioning of the processor with respect to the proper sequential execution of instructions. Further, system characteristic may be monitored and used. For example, the relative age of the load means may be recorded and used as a factor. Thus, a newly replaced load means may be selected even though the relative operational life since initialization alone would not so indicate.

The above and similar additions to the basic structure can of course be readily provided by those skilled in the art.

The present invention provides a highly versatile controller using the basic appropriate monitoring of various basic condition related factors and comparing such factors with a historical record to produce load related control outputs for a plurality of loads.

Various modes in carrying out the invention are contemplated as being within the scope of the following claims, particularly pointing out and distinctly claiming the subject matter which is regarded as the invention.

I claim:

1. A water heater apparatus comprising a water storage tank having a plurality of separate heating means, comprising a plurality of power supply connectors one for each of said heating means and operable to energize the corresponding heating means and establish "on" periods and "off" periods of energization, sensor means for sensing the temperature of the water in the storage tank and establishing an output signal proportional to the water temperature, temperature preset means for establishing a signal proportional to a predetermined desired water temperature, status means to record the number of heating means in "on" periods in operation and to record the accumulated "on" periods and thereby the accumulated operating time of energization over a plurality of periods of each of said heating means, controller logic means for comparing the output of the sensor means and the preset means and said heating means in the "on" period to establish the number of activated heating means, and said controller logic means connected to said status means and having operating means operable to turn the heating means on and off in accordance with the historical accumulated operating time inclusive of a plurality of past "on" and "off" periods of operation and thereby the relative accumulated operating time of energization of each of said heating means.

2. The apparatus of claim 1 wherein said controller logic means is operable to turn on the heating means which has the shortest accumulated operating time.

3. The heater apparatus of claim 1 or 2 including means to periodically compare said periods of operation and reset said periods relative to the shortest on period of operation.

4. The water heater apparatus of claim 1 or 2 wherein said controller logic means includes a microprocessor having a RAM memory including storage locations containing a status number corresponding to the number of energized heating elements and individual period of operation said microprocesser being operable to cyclically read said sensor means and the preset means and establish corresponding data numbers in said RAM memory for the actual temperature and the preset temperatures, said microprocessor being programmed to periodically determine the difference in the stored numbers for the actual temperature and the preset temperature to generate a control number encoded to the number of elements to be activated for such control number and operable to compare said control number with said status number for generating individual demand signal, said microprocessor including an operating program responsive to said demand signal and forming said operating means to turn said heating means "on" and "off".

5. The water heater apparatus of claim 4 including a span preset signal means for establishing a span signal corresponding to a selected variation in the temperature from the preset temperature, said microprocessor cyclically reading said span signal and establishing a corresponding span adjustment number and in calculating said control number divides said difference number by said span adjustment number.

6. The water heater apparatus of claim 4 wherein said controller is operable to turn on the deactivated heating means with the least period of operation and to turn off the activated heating means with the greatest period of operation.

7. A control apparatus for a plurality of load devices located to condition a load means, comprising a plurality of activators for operating said load devices, condition preset means for establishing a preset condition signal corresponding to a selected condition of said load means, sensor means for monitoring the condition of the load means and establishing a load-related condition signal, a controller means connected to said preset means and to said sensor means and including output signal means for individual operation of said activators for variably activating the number of said load devices, said controller means including status means monitoring the operating state of the load devices and the historical time of operation for said load devices to establish a record related to the length of the accumulated operating time and operation of each load device over a period inclusive of a plurality of time spaced operations of at least one load device and further including logic means to compare the output of the sensor means and the preset means and the status means to establish the output signal means corresponding to a predetermined individual output signals to control said load devices and comparison means to operate said switching means based on the current recorded periods of the accumulated operating time of operation of each load device so as to continuously tend to equalize the operating time of said load devices.

8. The apparatus of claim 7 wherein said sensor means includes means to sense the power consumption and to modify the actuation of the load devices in accordance with the power consumption.

9. The controller apparatus of claims 7 wherein said switching means turns on a device with the longest period of operation and turns off a device with the shortest period of operation.

10. A step load controller including a plurality of loads adapted to be selectively energized, comprising means coupled to said loads and operable to detect and monitor the relative operating period of each load, accumulating timing means for continuously updating and recording the accummulated periods of operation of each of the said loads over a substantial period during which all of said loads are actuated a substantial number of times, and comparator means connected to said timing means and operable to select, a load based on the relative accummulated periods between operation of all said loads for selective connection and disconnection of a load for purposes of controlling the overall relative operating periods of the plurality of the load means.

11. The step load controller of claim 10 wherein said timing means records the period of operation of each load by reference to the load having the shortest period of operation.

12. The step load controller of claim 11 having load demand means, means to monitor said load demand means and to periodically operate the comparator means, and means to update and record the accumulated operating period of the said loads at each operation of said comparator means.

13. The step load controller of claim 12 wherein said comparator means includes a microprocessor having a RAM memory and said microprocessor having a program to record the loads operating and the periods of operation of all said loads and generating an output for selective connection and disconnection of said loads.

14. A step controller for actuating a plurality of water heating elements for maintaining of a body of water at a substantially constant elevated temperature, comprising sensing means adapted to be coupled to said body of water and establishing a demand signal for turning said heating elements on and off, control means connected to said sensing means and operable to operate a plurality of said heating elements in proportion to the level of said demand signal, means coupled to each of said heating elements and operable to continuously monitor the state of the corresponding heating elements and establishing a continuous accumulative record of the accumulated time of recorded operation for each of said heating elements, comparison means to compare the relative accumulated times of operation of said elements over a period inclusive of a plurality of "on" times for at least one of said elements and establishing an output signal identifying the elements with the longest accumulated time of recorded operation and the heating elements with the shortest accumulated time of recorded operation, and a controller connected to said comparison means and operable upon a demand for increased heating of the water to activate the heating element with the shortest accumulated time of recorded operation and upon a reduced heating demand operable to deactivate the heating element from those then activated having the longest accumulated time of recorded operation and thereby continuously tending to vary the operating times of the several elements to cause the operating time of each element of move into equalization with the other elements.

15. The step controller of claim 14 wherein said control means includes a microprocessor having input means coupled to said sensing means and output means coupled to operate said plurality of said heating elements, said means coupled to each of said heating elements being connected to said microprocessor and establishing said continuous accummulative record of the period of operation of said heating elements, said microprocessor having said comparison means to compare the relative accumulating periods of each of said element and establishing an output identifying the element with the longest operating period of operating and the element with the shortest period of operation.

16. The step controller of claim 15, wherein said microprocessor having a program means to periodically read said sensing means and calculate the necessity to turn a heating element on or off, said microprocessor having an update program means to update said accumulative record of the periods of operation of said heating elements at each reading of said sensing means, said microprocessor update program defining each period of operation by reducing each period by the period of the shortest period of operation.

* * * * *

UNITED STATES PATENT AND TRADEMARK OFFICE
CERTIFICATE OF CORRECTION

PATENT NO. : 4,511,790

DATED : April 16, 1985

INVENTOR(S) : Norman M. Kozak

It is certified that error appears in the above-identified patent and that said Letters Patent is hereby corrected as shown below:

Abstract, line 16, Cancel "substracting" and substitute therefor ---subtracting---; Col. 1, line 6, Cancel "34" and substitute therefor ---32---; Col. 6, line 59, Cancel "themultiplexer" and substitute therefor ---the multiplexer---; Col. 7, line 52, Cancel "monitors" and substitute therefor ---monitor---; Col. 10, line 21, Cancel "the" and substitute therefor ---The---; Claim 4, col. 12, line 20, After "operation" insert ---,--- (comma); Claim 7, col. 12, line 68, After "predetermined" insert ---number of said load devices to be activated, and said controller means including switching means to establish---; Claim 10, col. 13, line 24, After "timing means" insert ---for comparing the recorded accumulated periods of operation of said loads---; Claim 10, col. 13, line 24, After "select" cancel "," (comma); Claim 10, col. 13, line 24, After "the" insert ---comparison of the---;

UNITED STATES PATENT AND TRADEMARK OFFICE
CERTIFICATE OF CORRECTION

PATENT NO. : 4,511,790
DATED : April 16, 1985
INVENTOR(S) : Norman M. Kozak

Page 2 of 2

It is certified that error appears in the above-identified patent and that said Letters Patent is hereby corrected as shown below:

Claim 10, col. 13, line 25, After "periods" cancel "between" and insert ---of---; Claim 10, col. 13, line 25, After "operation" cancel "of" and insert ---between---; Claim 14, col. 14, line 12, Cancel "elements" and substitute therefor ---element---; Claim 14, col. 14, line 24, Cancel "of" second occurrence to read -- to --. Claim 15, col. 14, line 38, Cancel "operating" (second occurrence) and substitute therefor --- operation---; Claim 16, col. 14, line 40, After "15" cancel "," (comma)

Signed and Sealed this

Fourth Day of March 1986

[SEAL]

Attest:

DONALD J. QUIGG

Attesting Officer

Commissioner of Patents and Trademarks